(12) United States Patent
Lei

(10) Patent No.: US 10,298,034 B2
(45) Date of Patent: May 21, 2019

(54) EMERGENCY POWER SUPPLY SYSTEM AND MANAGEMENT METHOD

(71) Applicant: Shenzhen Carku Technology Co., Ltd., Shenzhen (CN)

(72) Inventor: Yun Lei, Shenzhen (CN)

(73) Assignee: SHENZHEN CARKU TECHNOLOGY CO., LTD, Longgang District, Shenzhen (CN)

(*) Notice: Subject to any disclaimer, the term of this patent is extended or adjusted under 35 U.S.C. 154(b) by 95 days.

(21) Appl. No.: 15/245,142

(22) Filed: Aug. 23, 2016

(65) Prior Publication Data
US 2018/0006490 A1 Jan. 4, 2018

(30) Foreign Application Priority Data

Jun. 30, 2016 (CN) .................... 2016 1 0506106
Jun. 30, 2016 (CN) .................... 2016 1 0506137

(51) Int. Cl.
H02J 7/00 (2006.01)
H02J 9/06 (2006.01)
H01M 10/42 (2006.01)

(52) U.S. Cl.
CPC .......... H02J 7/0031 (2013.01); H02J 7/0054 (2013.01); H02J 9/06 (2013.01); H01M 2010/4278 (2013.01); H02J 2007/0096 (2013.01); H02J 2007/0098 (2013.01)

(58) Field of Classification Search
CPC ................. H02J 7/0029–7/0036; H01M 10/425–10/4264
See application file for complete search history.

(56) References Cited

U.S. PATENT DOCUMENTS

| 2005/0110467 | A1 | 5/2005 | Thomason | |
| 2007/0018609 | A1 | 1/2007 | Yen | |
| 2007/0123316 | A1* | 5/2007 | Little | G06F 21/31 455/573 |
| 2010/0173182 | A1* | 7/2010 | Baxter | H01M 10/42 429/61 |
| 2012/0074894 | A1* | 3/2012 | Chen | B60L 11/005 320/103 |
| 2012/0139491 | A1* | 6/2012 | Eberhard | H02J 7/0016 320/118 |
| 2012/0235485 | A1* | 9/2012 | Trock | H02J 7/0021 307/48 |
| 2013/0099736 | A1 | 4/2013 | Roberts et al. | |

(Continued)

Primary Examiner — Rexford N Barnie
Assistant Examiner — David A Shiao
(74) Attorney, Agent, or Firm — Jun He Law Offices P.C.; James J. Zhu

(57) ABSTRACT

The present invention discloses an emergency power supply system for supplying power to an external device, comprising: an emergency power supply and a battery clamp connected to the emergency power supply. The connection between the battery clamp and the emergency power supply comprises communication connection, by which the battery clamp can obtain parameters of the emergency power system, and perform corresponding actions based on the parameters. In another aspect, the present invention provides a method for managing the system. The system and method can effectively prevent the problems of the lithium batteries resulted from large starting electric current, high temperature and over-charging or over-discharging.

18 Claims, 8 Drawing Sheets

(56) References Cited

U.S. PATENT DOCUMENTS

| | | | |
|---|---|---|---|
| 2013/0169038 A1* | 7/2013 | King | H02J 7/0031 |
| | | | 307/10.1 |
| 2013/0264995 A1* | 10/2013 | Lee | B60L 11/1803 |
| | | | 320/104 |
| 2014/0265592 A1 | 9/2014 | Clarke et al. | |
| 2014/0315048 A1* | 10/2014 | Yang | H01M 10/4207 |
| | | | 429/50 |
| 2015/0054467 A1* | 2/2015 | Takano | H01M 10/48 |
| | | | 320/136 |
| 2015/0171632 A1* | 6/2015 | Fry | H02J 7/0004 |
| | | | 307/22 |
| 2015/0180258 A1* | 6/2015 | Ujike | H01M 10/4207 |
| | | | 320/106 |
| 2015/0244184 A1* | 8/2015 | Kerfoot, Jr. | H01M 10/425 |
| | | | 320/106 |
| 2016/0001666 A1* | 1/2016 | Nook | H02J 7/0054 |
| | | | 320/105 |
| 2016/0336770 A1* | 11/2016 | Benz | H01M 10/425 |

\* cited by examiner

EMERGENCY POWER SUPPLY SYSTEM AND MANAGEMENT METHOD

CROSS REFERENCE TO PRIORITY

This application claims priority to Chinese Patent Application No. 201610506137.3 filed Jun. 30, 2016, and also claims priority to Chinese Patent Application No. 201610506106.8 filed Jun. 30, 2016. The disclosure of which is incorporated by reference herein in its entirety.

TECHNICAL FIELD

The present invention relates to the field of emergency power supply management and, in particular, to an emergency power supply system and management method.

BACKGROUND

At present, the technology of high power lithium battery applied to an emergency power supply is gradually developed. In order to improve battery capacity, it's common for an emergency power supply to be composed of a plurality of lithium battery units. The use of high power lithium batteries makes an emergency power supply has a long service life, less pollution, small size and good portability etc. However, the lithium batteries in an emergency power supply have intrinsic defects. For example, when being used for starting a vehicle, the starting electric current of an emergency power supply could be very large (up to between 100 A-500 A). In addition, other malfunctions, e.g., high temperature and over-charging or over-discharging, will result in battery bulge of an emergency power supply, or even an explosion, which may cause personal injury and property loss.

Although the existing smart battery clamps can provide a large electric current during the starting of a vehicle, they cannot detect real-time operating status of the emergency power supply and adjust the operating modes based on the detection. Therefore, it's necessary to provide an emergency power supply system and management method for solving the aforementioned problems, so that users can safely and trustingly use the emergency power supply of lithium batteries.

On the other hand, the type of a battery module within an emergency power supply of a vehicle can be mainly divided into the categories shown in the following Table 1:

TABLE 1

| Type of battery module | Connection manner | Voltage of battery unit | Nominal voltage of battery pack |
|---|---|---|---|
| 3C Lithium Cobalt Oxide | 3 in series | 3.7 V | 11.1 V |
| 4C Lithium Cobalt Oxide | 4 in series | 3.7 V | 14.8 V |
| 4F Lithium Iron Phosphate | 4 in series | 3.2 V | 12.8 V |

When starting a vehicle, the corresponding operating modes of various types of batteries are different. Accordingly, different types of emergency power supply shall be equipped with corresponding different types of battery clamps respectively, which are incompatible to each other, and thus bring inconvenience for production and use.

SUMMARY

The purpose of the present invention is to provide an emergency power supply system and management method, which aims to solve the above mentioned problems e.g. battery bulge, or even an explosion resulted from large starting electric current, high temperature, over-charging or over-discharging, which may cause personal injury and property loss. Meanwhile, the system aims to solve the compatibility problem when using different types of battery modules.

In order to solve the aforesaid problems, in one aspect, the system for supplying power to an external device, comprising: an emergency power supply and a battery clamp connected to the emergency power supply. The emergency power supply comprises: a battery module, and a first master-control unit connected to the battery module for monitoring the battery module. The battery clamp comprises: a second master-control unit communicatively connected to the first master-control unit for obtaining parameters of the emergency power supply; and a switch control unit controlled by the second master-control unit, and being connectable to the external device. Wherein the second master-control unit is configured to perform corresponding actions based on the parameters of the emergency power supply.

Preferably, the battery module comprises at least one battery packs which are connected in series, and the at least one battery pack comprises at least one battery units which are connected in parallel.

Preferably, the parameters of the emergency power supply comprise at least one of the following: type of the battery module, capacity of the battery module, temperature of the at least one battery unit or battery pack, voltage of the at least one battery unit.

Preferably, the first master-control unit comprises a temperature detection circuit for detecting temperature parameters of the at least one battery unit or battery pack.

Preferably, the temperature detection circuit comprises one or more NTC thermistors for detecting the temperature parameters of the at least one battery unit or battery pack.

Preferably, the first master-control unit comprises a voltage sampling circuit connected to the at least one battery unit for detecting voltage parameters of the at least one battery unit.

Preferably, the second master-control unit is further configured to control the switching of the switch control unit based on the received parameters of the emergency power supply, thereby controlling power connection between the emergency power supply and the external device.

Preferably, the second master-control unit is further configured to compare the temperature parameters of the at least one battery unit or battery pack with a predefined temperature value, and control the switching of the switch control unit based on the comparison result.

Preferably, the second master-control unit is further configured to compare the difference between the voltages of any two of the at least one battery units with a predefined voltage value, and control the switching of the switch control unit based on the comparison result.

Preferably, the second master-control unit is further configured to, based on the type information of the battery module, set an operating mode, and the operating mode comprises at least one of the following: ranges of operating voltage, protection thresholds of starting electric current, or low voltage alert threshold for the emergency power supply.

In another aspect, the present invention provide a method for managing an emergency power supply. The system comprises a battery clamp and an emergency power supply connected to an external device via the battery clamp. The method comprises: establishing a communication connection between the battery clamp and the emergency power supply; by the battery clamp, obtaining parameters of the emergency power supply via the communication connection; and by the battery clamp, performing corresponding actions based on the parameters of the emergency power supply.

Preferably, the emergency power supply comprises a battery module, which comprising at least one battery pack, and the at least one battery pack comprises at least one battery unit; the parameters of the emergency power supply comprise at least one of the following: type of the battery module, capacity of the battery module, temperature of the at least one battery unit or battery pack, voltage of the at least one battery unit.

Preferably, the corresponding actions performed by the battery clamp based on the parameters of the emergency power supply comprise: based on the type information of the battery module, setting an operating mode, and the operating mode comprises at least one of the following: ranges of operating voltage, protection threshold of starting electric current, or low voltage alert threshold for the emergency power supply.

Preferably, the corresponding actions performed by the battery clamp based on the parameters of the emergency power supply comprise: controlling the switching of the power connection between the emergency power supply and the external device.

Preferably, the corresponding actions performed by the battery clamp based on the parameters of the emergency power supply comprise: determining whether the temperature parameters are above a predefined temperature value; if yes, the battery clamp switches off the power connection between the emergency power supply and the external device to stop power supply to the external device.

Preferably, the corresponding actions performed by the battery clamp based on the parameters of the emergency power supply comprise: determining whether the difference between voltages of any two of the battery units are above a predefined voltage value; if yes, the battery clamp switches off the power connection between the emergency power supply and the external device to stop power supply to the external device.

Preferably, the step of obtaining the parameters of the emergency power supply further comprises: by the battery clamp, sending a query request to the emergency power supply; in response to the query request, by the emergency power supply, replying the battery clamp with parameters about the emergency power supply.

Preferably, the parameters of the emergency power supply is represented by a data packet, which comprises at least: a first start bit, one or more first data bits, and a first end bit.

Preferably, the query request is represented by a data packet, which comprises at least: a second start bit, one or more second data bits, and a second end bit.

BRIEF DESCRIPTION OF THE DRAWINGS

In order to clearly understand the technical solution in the embodiments of the present invention, drawings that used for the embodiments or prior art will be briefly introduced below. Obviously, the drawings described below are merely some embodiments of the present invention. For a person skilled in the art, other drawings can be obtained according to these drawings below without any inventive effort.

DETAILED DESCRIPTION

The present invention is further described below along with the drawings and embodiments, in order to clearly understand the purpose, technical solution and advantage thereof. It should be noted that, the embodiments described herein is merely used to explain the present invention, rather than limit the same.

Figure 1:
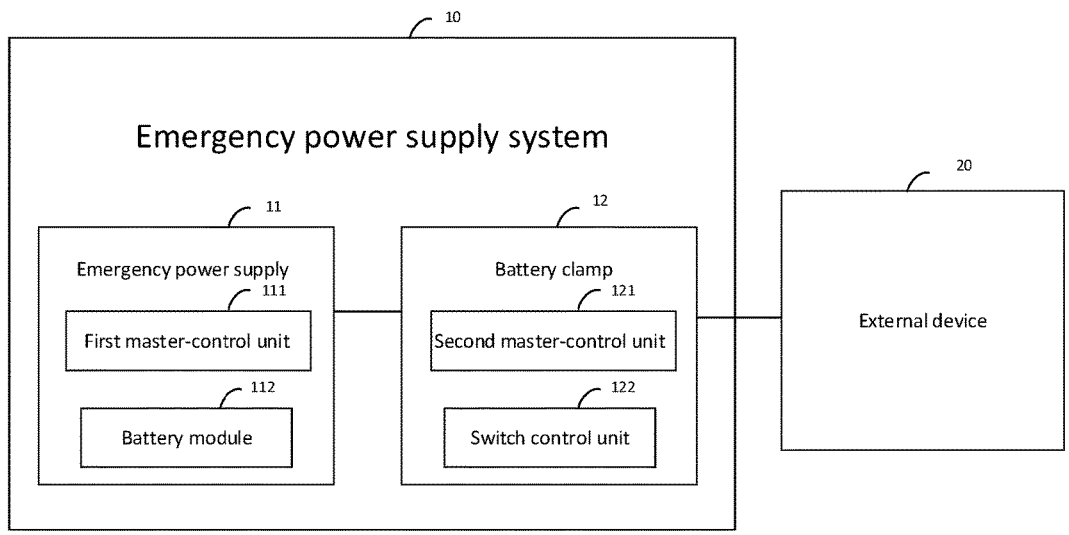
FIG. 1 is a structure diagram of an emergency power supply system according to one embodiment of the present invention.

FIG. 1 illustrates the structure of an emergency power supply system 10 according to one embodiment of the present invention. The system 10, which is used for supplying power to an external device 20, comprises an emergency power supply 11 and a battery clamp 12 connected to the emergency power supply 11.

In practice, the battery clamp 12 can be connected to the emergency power supply 11 via a pluggable interface. The connection between the battery clamp 12 and the emergency power supply 11 also comprises a communication connection, by which the battery clamp 12 can obtain parameters of the emergency power supply 11, and can be configured to perform corresponding actions based on the parameters. The communication connection between the emergency power supply 11 and the battery clamp 12 can be wired connections, such as via a serial interface, or can be wireless connections, such as via Bluetooth, NFC, Wi-Fi etc.

When the external device is a vehicle, the emergency power supply 11 is connected to the vehicle by the battery clamp 12 so as to provide starting electric current for the vehicle. As the starting electric current would be very large, and the vehicle sometimes needs to be started a couple of times, it is possible to result in a bulge on a lithium battery of the emergency power supply, or even an explosion. In case the above problem occurs, the battery clamp 12 can obtain real-time parameters of the emergency power supply, such as temperature and voltage etc., and determine whether the temperature or voltage of the emergency power supply 11 exceeds a safe threshold.

The safe threshold, which is a predefined value written into the battery clamp 12 in advance, comprises a predefined temperature value, a predefined voltage value etc. If the temperature or voltage of the emergency power supply 11 exceeds the predefined values, the voltage supply provided to a vehicle will be stopped, so as to protect lithium batteries of the emergency power supply 11.

As illustrated in FIG. 1, the emergency power supply 11 comprises a first master-control unit 111 and a battery module 112. The first master-control unit 111 comprises a first control chip U1, which typically is a Microprogrammed Control Unit (MCU). The first master-control unit 111 is connected to the battery module 112 for monitoring the battery module 112.

Figure 2:
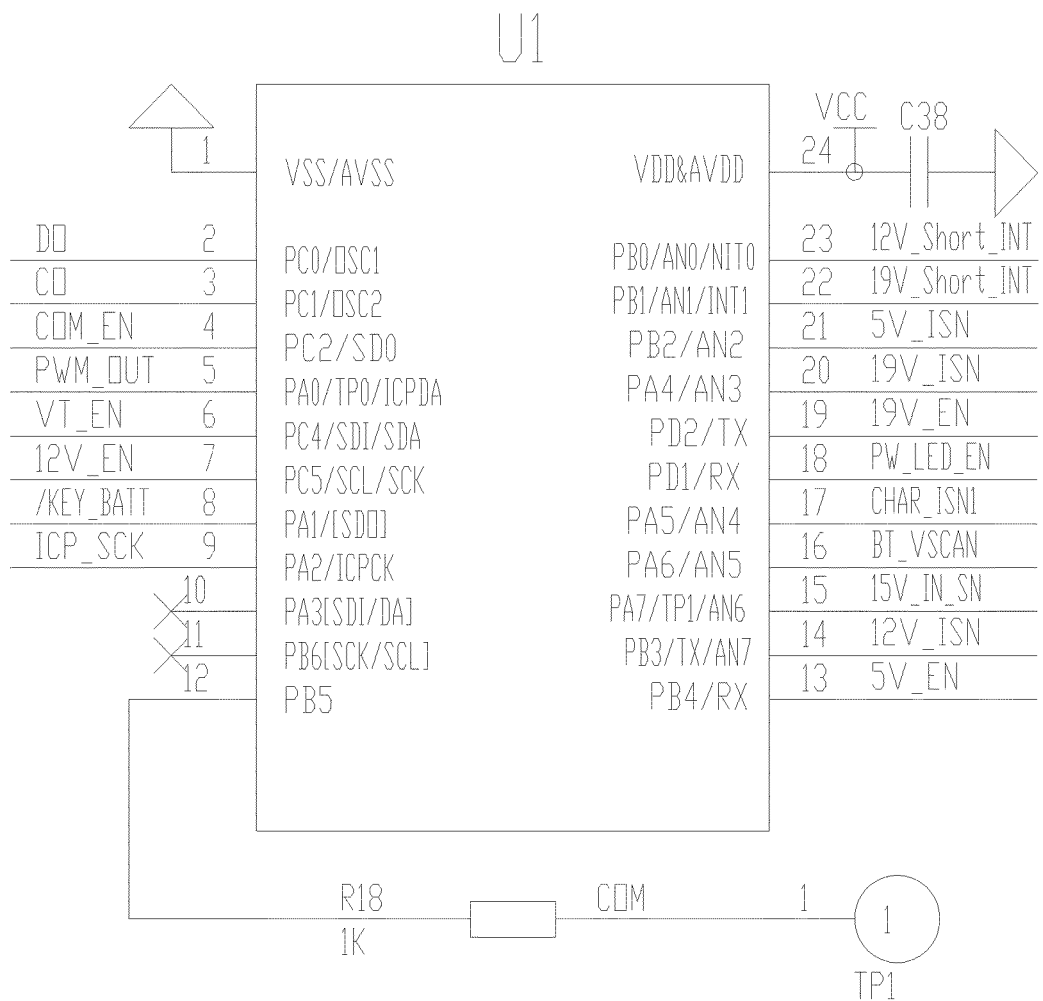
FIG. 2 is a circuit diagram of a first master-control unit of an emergency power supply according to one embodiment of the present invention.

According to one embodiment of the present invention, a circuit diagram of the first control chip U1 is illustrated by FIG. 2.

According to one embodiment of the present invention, the battery module 112 comprises at least one battery packs which are connected in series. The battery pack comprises at least one battery units which are connected in parallel.

As illustrated in FIG. 1, the battery clamp 12 comprises a second master-control unit 121 and a switch control unit 122. The second master-control unit 121 comprises a second control chip U2, which typically is a MCU. The second master-control unit 121 is communicatively connected to the first master-control unit 111 for obtaining parameters of the emergency power supply 11. The second master-control unit 121 is connected to the switch control unit 122, and is configured to perform corresponding actions based on the received parameters.

According to one embodiment of the present invention, the switch control unit comprises a relay.

According to one embodiment of the present invention, the parameters of the emergency power supply comprises: type of the battery module, capacity of the battery module, temperature of the battery unit or battery pack, voltage of the battery unit, or difference between the voltages of any two of the battery units. The battery clamp 12 is also provided with a predefined value, such as a predefined temperature value, or a predefined voltage value etc.

According to one embodiment of the present invention, the corresponding actions performed by the battery clamp 12 based on the parameters of the emergency power supply 11 comprise: setting an operating mode based on the type of the battery module.

The operating mode comprises at least one of the following: ranges of operating voltage, protection thresholds of starting electric current, or low voltage alert threshold for the emergency power supply 11.

According to one embodiment of the present invention, the battery clamp 12 is configured to control the switching of power connection between the emergency power supply 11 and the external device 20 based on the parameters of the emergency power supply 11.

According to one embodiment of the present invention, the first master-control unit 111 further comprises a temperature detection circuit for detecting temperature parameters of battery units or battery packs.

Figure 3:
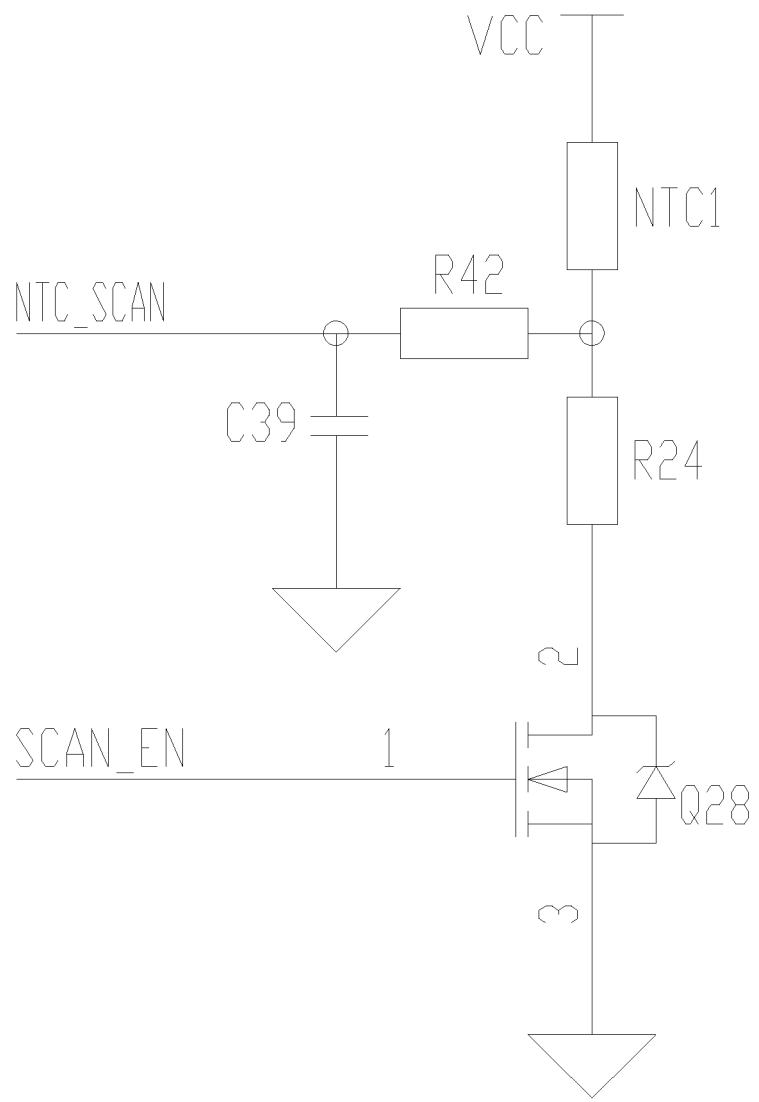
FIG. 3 is a diagram of a temperature detection circuit of an emergency power supply according to one embodiment of the present invention.

FIG. 3 is an embodiment of the temperature detection circuit. The temperature detection circuit comprises a NTC thermistor, which can detect temperatures of battery units or battery packs caused by large electric current in real time. An input control pin SCAN_EN of the temperature detection circuit is connected to the $3^{rd}$ pin of the first control chip U1. A signal output pin NTC_SCAN of the temperature detection unit is connected to the $2^{nd}$ pin of the first control chip U1. The first control chip U1 inputs signals via the pin SCAN_EN, so as to control the operating of the temperature detection circuit. The detected temperature parameters of battery units or battery packs are then transmitted back to the first control unit U1 via the pin NTC_SCAN. When the temperature of the battery module 112, or the temperature of one battery unit in the battery module 112 is too high, the first master-control unit 111 can detect the value of said high temperature and send it to the battery clamp 12.

According to one embodiment of the present invention, the first master-control unit 111 further comprises a voltage sampling circuit and equalization circuits.

Figure 4:
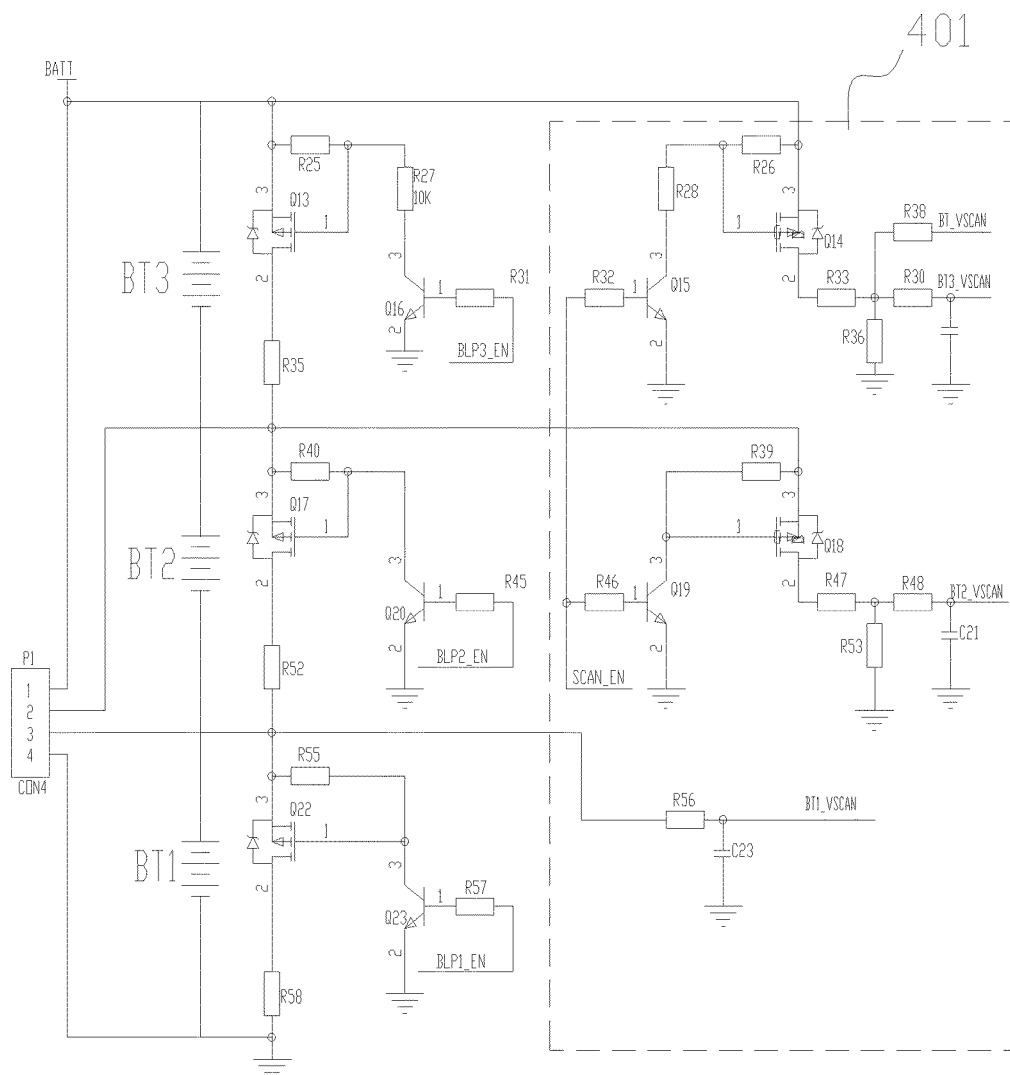
FIG. 4 is a diagram of a voltage sampling circuit of an emergency power supply according to one embodiment of the present invention.

FIG. 4 illustrates an embodiment of a voltage sampling circuit 401 and equalization circuits. The voltage sampling circuit 401 is connected to battery units via the equalization circuits for detecting voltage parameters of the battery units. The voltage sampling circuit 401 is also configured to deliver the voltage parameters of the battery units to the first master-control unit 111. The first master-control unit 111 is configured to compute a difference between voltage parameters of any two of the battery units, and then send the difference to the battery clamp 12. Input control pins BLP1_EN, BLP2_EN, BLP3_EN of the equalization circuits are respectively connected to the $7^{th}$, $11^{th}$, and $20^{th}$ pins of the first control chip U1. The input control pin SCAN_EN of the voltage sampling circuit is connected to the $19^{th}$ pin of the first control chip unit U1. Output control pins BT_VSCAN, BT1_VSCAN, BT2_VSCAN, and BT3_VSCAN of the voltage sampling circuit are respectively connected to the $16^{th}$, $23^{th}$, $22^{nd}$ and $15^{th}$ of the first control chip U1. The first control chip U1 is configured to obtain voltage parameters of battery units through the signal output pins BT_VSCAN, BT1_VSCAN, BT2_VSCAN, and BT3_VSCAN of the voltage sampling circuit.

Figure 5:
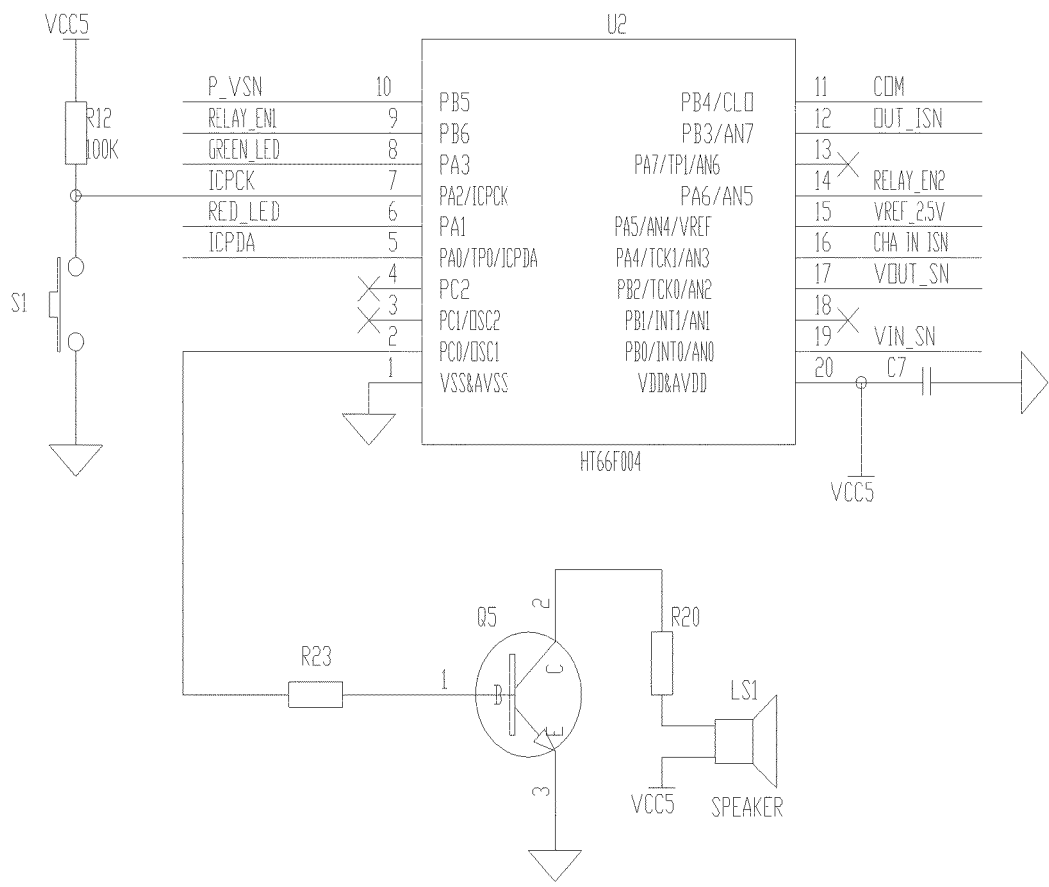
FIG. 5 is a circuit diagram of a second master-control unit of a battery clamp according to one embodiment of the present invention.

FIG. 5 is a circuit diagram of a second master-control unit 121 of the battery clamp 12 according to one embodiment of the present invention. As shown in FIG. 5, the second master-control unit 121 mainly comprises a second control chip U2, which is mainly used for obtaining parameters of the emergency power supply 11.

Figure 6:
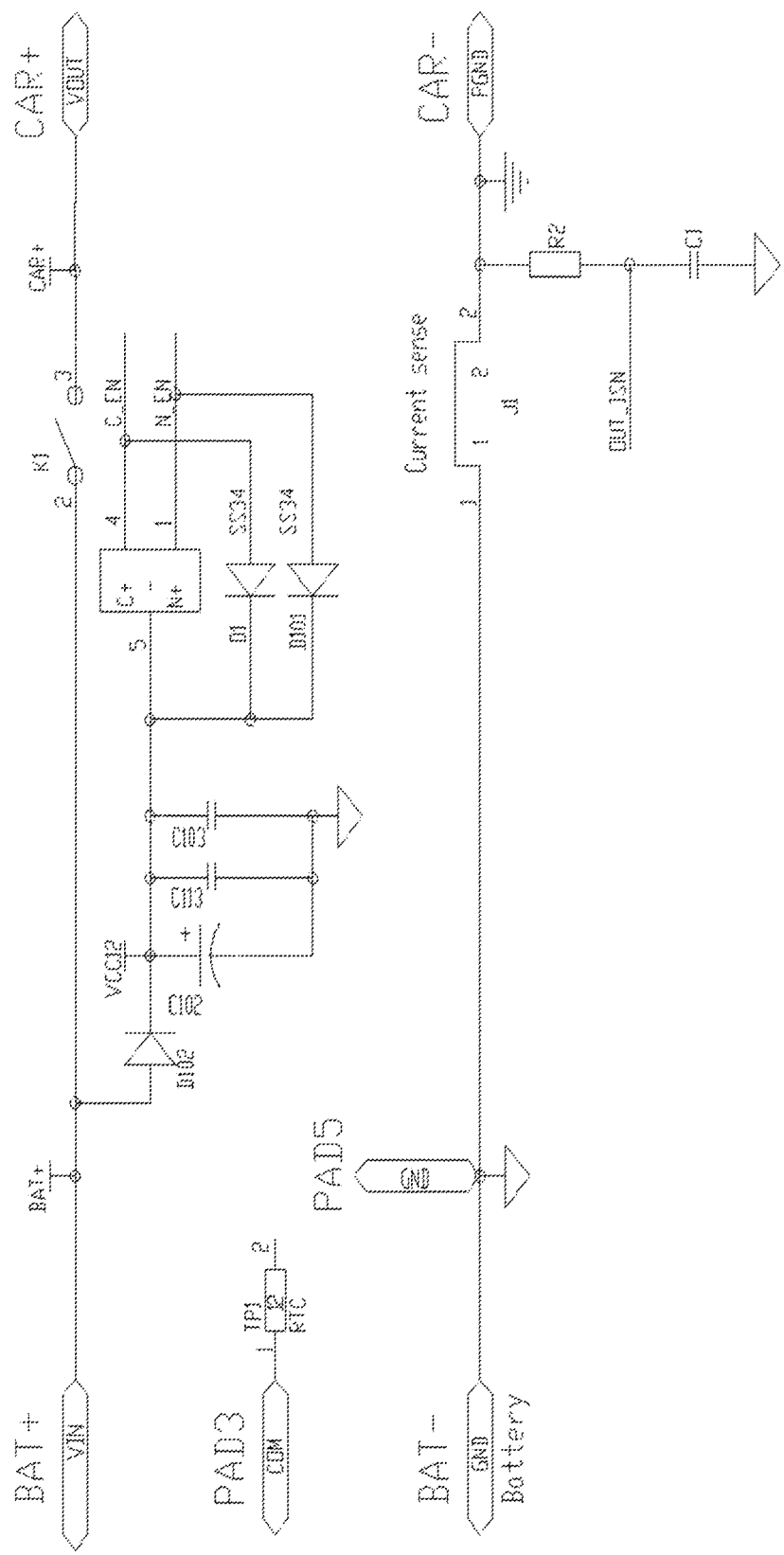
FIG. 6 is a circuit diagram of a switch control unit and communication interfaces of a battery clamp according to one embodiment of the present invention.

FIG. 6 is a circuit diagram of a switch control unit K1 and a communication interface according to one embodiment of the invention. The battery clamp 12 comprises a switch control unit K1, an anode input port BAT+, a cathode input port BAT−, an anode output port CAR+, a cathode output port CAR−, and a communication interface PAD3.

As illustrated in FIG. 6, the communication interface PAD3 of the battery clamp 12 is connected to a pin COM of the second control chip U2. The communication interface PAD3 is also connected to a port TP1 of the first control chip U1 in the first master-control unit 111, so as to achieve communication connection between the first master control unit 111 and the second master-control unit 121. The second master-control unit 121 is configured to obtain parameters of the emergency power supply 11 via the communication interface PAD3.

As illustrate in FIG. 6, the anode input port BAT+ of the battery clamp 12 is connected to an anode output port (not shown) of the emergency power supply via the switch control unit K1, so as to receive anode output voltage of the emergency power supply 11. The cathode input port BAT− of the battery clamp 12 is connected to a cathode output port (not shown) of the emergency power supply, so as to a receive cathode output voltage of the emergency power supply 11.

The second control chip U2 of the second master-control unit 121 is configured to control the switching of the switch control unit K1 via two pins C_EN (corresponding to a pin RELAY_EN2 of U2) and N_EN (corresponding to a pin RELAY_EN1 of U2). After obtaining parameters of the emergency power supply 11, the second master-control unit 121 is configured to control the switch control unit K1, thereby switching on/off a connection between the emergency power supply 11 and the external device 20.

After obtaining parameters of the emergency power supply 12, the battery clamp 12 is configured to control the switch control unit K1 for performing corresponding actions. The corresponding actions at least comprise: by the battery clamp 12, setting a corresponding operating mode based on the type of a battery module. The operating mode comprises at least one of the following: ranges of operating voltage, protection threshold of starting electric current, and low voltage alert threshold for the emergency power supply 11. According to one aspect of the present invention, the corresponding actions comprise: by the battery clamp 12, controlling the switching on/off of a power connection between the emergency power supply 11 and the external device 20 based on the type of a battery module.

According to one embodiment of the present invention, parameters of the emergency power supply 11 obtained by the battery clamp 12 comprise: temperature parameters of a battery unit or battery pack. The battery clamp 12 is configured to compare temperature parameters of a battery unit or battery pack with a predefined temperature value, and determine whether to stop power supply to the external device 20 based on the comparison result. For example, with a predefined temperature value of 55° C., if the temperature value of a battery unit exceeds the predefined temperature value of 55° C., the battery clamp 12 will stop power supply to the external device 20.

According to one embodiment of the present invention, the parameters of the emergency power supply 11 obtained by the battery clamp 12 comprise: difference between voltage parameters of any two of battery units. The battery clamp 12 is configured to obtain difference between voltage parameters of any two of battery units based on the received parameters, and compare the difference with a predefined voltage value, and then determine whether to stop power supply to the external device 20 based on the comparison result. For example, with a predefined voltage value of 1V, if the difference between voltage parameters of any two of battery units exceeds 1V, the battery clamp 12 will stop power supply to the external device 20, so as to protect the emergency power supply 11.

The external device 20 can be a vehicle or a yacht etc.

According to one embodiment of the present invention, obtaining parameters of the emergency power supply 11 comprises: obtaining type of a battery module, or capacity of a battery module. The type of a battery module comprises: battery type and connection manner etc. For example, three lithium cobalt oxide batteries are connected in series, four lithium iron phosphate batteries are connected in series etc.

The battery clamp 12 is configured to set a corresponding operating mode based on the type of a battery module. The corresponding operating mode comprises at least one of the following: operating voltage, low voltage alert threshold, and protection threshold of starting electric current for the emergency power supply 11. Corresponding parameters of different operating modes can be set in the battery clamp 12 in advance. A protection threshold of starting electric current is a maximum value of starting electric current permitted for the emergency power supply 11. Generally, with regard to different types of emergency power supplies, the range for the protection threshold of starting electric current is 400 A-1500 A.

Different types of batteries and different connection manners require different operating modes. For example, in a 3C lithium cobalt oxide battery module, the operating mode can be: operating voltage being 8.1-12.6V, voltage of a battery unit being no less than 2.7V, protection threshold of staring electric current being 550 A. However, in a 4F lithium iron phosphate battery module, the operating mode can be: operating voltage being 8-14.6V, voltage of a battery unit being no less than 2.0V, protection threshold of staring electric current being 600 A. See Table 2 for details. Table 2 can be stored in the battery clamp 12 in advance, such that the battery clamp 12 can detect abnormal conditions for various operating modes.

After obtaining the type of a battery module, the battery clamp 12 is configured to select an operating mode which corresponding to the emergency power supply 11. For example, the battery clamp 12 is configured to obtain the type of a battery module which is sent by the emergency power supply 11. If the type of a battery module is a 3C lithium cobalt oxide battery, as illustrated in Table 2, the battery clamp 12 will set the operating voltage of 8.1-12.6V, the protection threshold of starting electric current being 550 A, and low voltage alert threshold being 2.7V. The battery clamp 12 is capable of detecting abnormal conditions with regard to various operating modes. An alert or any other indication will be generated, when the voltage of a battery unit is below 2.7V, or the starting electric current exceeds 550 A.

Capacity of a battery module is the information about amount of capacity. The battery clamp 12 is configured to set protection threshold of starting electric current based on the capacity of a battery module, so as to prevent the problems, e.g. breakdown resulted from the oversized electric current. Accordingly, the system comprising the emergency power supply 11 and the battery clamp 12 as well as the corresponding external device 20 can be effectively protected.

TABLE 2

Parameters with regard to different types of battery modules

| Type of battery module | Operating voltage | Low voltage alert threshold | Protection threshold of starting electric current |
|---|---|---|---|
| 3C lithium cobalt oxide | 8.1-12.6 v | Voltage of one battery unit is below 2.7 v | 550 A |
| 4F lithium iron phosphate | 8-14.6 v | Voltage of one battery unit is below 2.0 v | 600 A |
| 4C lithium cobalt oxide | 10.8-16.8 v | Voltage of one battery unit is below 2.7 v | 600 A |

In general, a battery pack within an emergency power supply is composed of three or four battery units that are connected in series or in parallel. It's unavoidable for battery units of lithium battery to be slightly different even made out of the same manufacture process, and a battery pack composed of lithium battery units also encounters discrepancy within one pack. When one battery unit in a battery pack suffers insufficient electric quantity or increased internal resistance, it is difficult to detect such abnormal conditions from positive/negative electrode ports of a battery pack. When a user utilizes a battery pack, in which a voltage difference of two battery units is large, to start a vehicle, the large starting electric current will result in bulge on the worst battery unit, or even an explosion. By the above solution, the abnormal conditions can be detected in time, and corresponding measures can be adopted to avoid defects in a single battery unit of an emergency power supply.

According to one embodiment of the present invention, the second master-control unit 121 further comprises an anti-inverse detection unit. The anti-reverse detection unit is used for detecting whether a user has inversely connected wire clamps, so as to protect the circuit.

According to one embodiment of the present invention, the second master-control unit 121 further comprises an indicator light circuit unit. The indicator light circuit unit is used for indicating operating status of the battery clamp 12. The operating status comprises: a normal condition, which is indicated by a green light, and an abnormal condition, which is indicated by a red light, such that a user will be alerted when an abnormal condition occurs.

According to one embodiment of the present invention, the second master-control unit 121 further comprises a buzzing circuit unit. When an emergency power supply system encounters an abnormal condition, the buzzing circuit unit is configured to alert a user about the abnormal condition.

Figure 7:
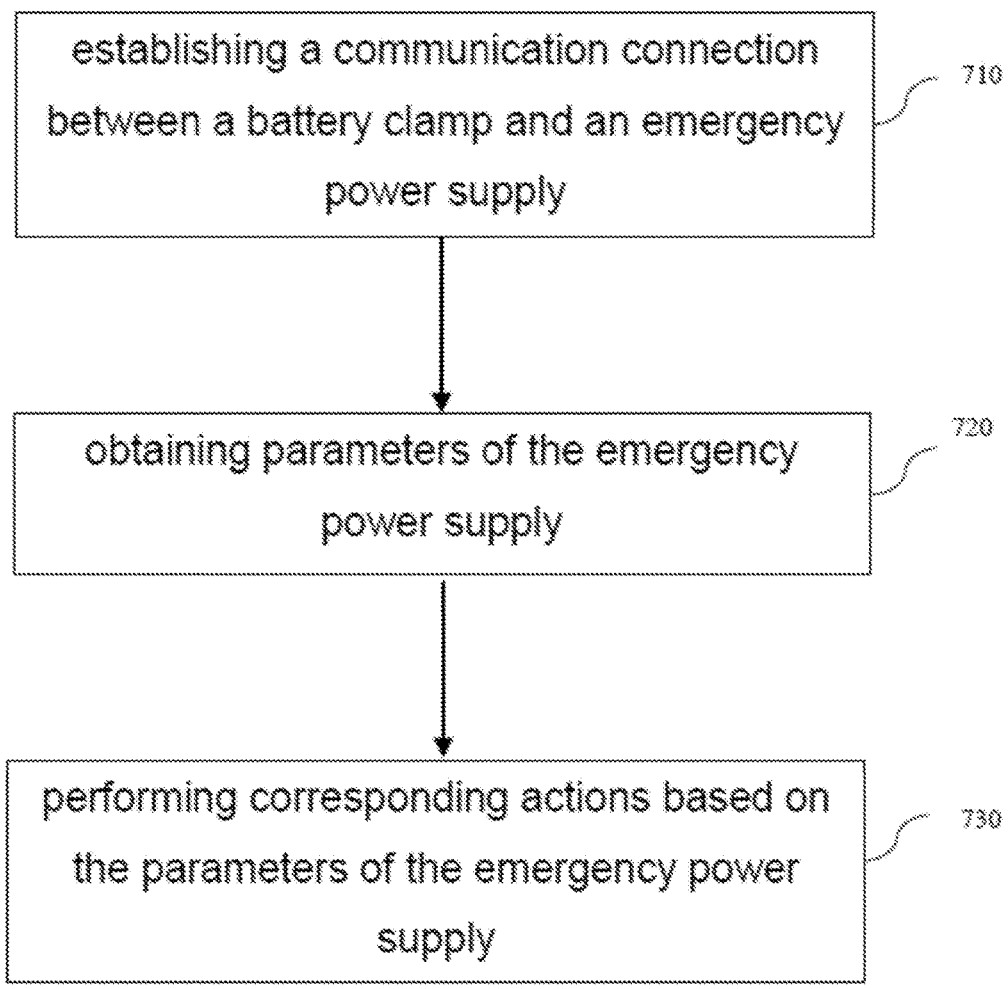
FIG. 7 is a flow diagram of a method for managing an emergency power supply according to one embodiment of the present invention.

FIG. 7 illustrates a flow diagram of a method for managing an emergency power supply system according to one embodiment of the present invention. The method comprises the following steps:

S710: establishing a communication connection between the battery clamp 12 and the emergency power supply 11.

Specifically, an emergency power supply system is illustrated in FIGS. 1-6. The second control chip U2 of the battery clamp 12 is connected to the communication interface PAD3 via the pin COM. Then the communication interface PAD3 is further connected to the port PT1 of the control chip U1 in the first master control unit 111. Thus, the communication connection between the second master-control unit 121 of the battery clamp 12 and the first master-control unit 111 of the emergency power supply 11 is established.

The communication between the emergency power supply 11 and the battery clamp 12 can be wired connections, such as via serial interface, or can be wireless connections, such as Bluetooth, NFC, Wi-Fi etc.

S720: by the battery clamp 12, obtaining parameters of the emergency power supply 11 via the communication connection.

In this step, obtaining parameters of the emergency power supply 11 means: by the battery clamp 12, obtaining corresponding parameters of a battery module in the emergency power supply 11 via the communication connection.

Obtaining parameters of the emergency power supply 11 comprises: obtaining temperature of battery unit or battery pack of the emergency power supply 11, obtaining difference between voltage parameters of any two of battery units, or obtaining type, or capacity of a battery module in the emergency power supply 11 etc.

In one embodiment of the present invention, a data packet for parameters of the emergency power supply 11 is illustrated as follows:

TABLE 3

A data packet for parameters in an emergency power supply

| First start bit | First data bits | First end bit |
| --- | --- | --- |

Specifically, a data packet of parameter comprises: a first start bit, one or more first data bits and a first end bit. The first start bit is used for synchronizing, the first data bits represent relevant parameters of a battery module, and the first end bit indicates termination of data transmission.

One or more first data bits can be used for representing battery status, type or capacity of a battery module, temperature of a battery unit or battery pack, voltage of a battery unit etc. Meanwhile, the definition of the first data bits can be adjusted according to actual needs, thus no limitation would be made herein.

Type of a battery module represents type of a battery, which is used to match a corresponding type of a battery clamp. The type or capacity of a battery module is represented by the first data bits.

According to one embodiment of the present invention, a binary number with four bits can be used for representing type of a battery module. For example, 0001 represents that, the battery clamp matches a 3C lithium cobalt oxide battery; 0002 represents that, the battery clamp matches a 4C lithium cobalt oxide battery; 0003 represents that, the battery clamp matches a 4F lithium iron phosphate battery.

According to one embodiment of the present invention, a binary number with two bytes can be used for representing capacity of a battery module. The range of capacity of a battery module, which is represented by the binary number, can be: 0-6535 mAh.

The first data bits also can represent battery status. The battery status includes: voltage of a battery unit, temperature of a battery unit or a battery pack etc.

According to one embodiment of the present invention, a binary number with four bits can be used for representing voltage of a battery unit. The range being represented is 0-15V, and can be specifically set according to actual needs.

According to another embodiment of the present invention, a binary number with one bit, i.e. 1 or 0, also can be used for simply representing voltage of a battery unit. Temperature of a battery unit or battery pack also can be represented in a similar way. As discussed above, when indicating voltage of a battery unit, 1 represents under-voltage, and 0 represents normal; when indicating temperature of batteries, 1 represents over-temperature, and 0 represents normal.

S730: by the battery clamp 12, performing corresponding actions based on parameters of the emergency power supply 11.

In Step 730, the battery clamp 12 can control the switch control unit K1 to perform corresponding actions after obtaining parameters of the emergency power supply 11.

The corresponding actions at least comprise: by battery clamp 12, setting corresponding operating modes. The operating modes comprise at least one of the following: range of operating voltage, protection threshold of starting electric current, and low voltage alert threshold for the emergency power supply 11. In addition, the battery clamp 12 can control the switching of power connection between the emergency power supply 11 and the external device 20.

According to one embodiment of the present invention, a predefined value, which is a predefined temperature value, can be set in the battery clamp 12 in advance. The battery clamp 12 compares whether the temperature of a battery unit or battery pack exceeds the predefined temperature value: if the temperature exceeds the predefined temperature value, the battery clamp 12 switches off connection between the emergency power supply 11 and the external device 20, so as to stop power supply to the external device 20; if the temperature is below or equal to the predefined temperature value, the battery clamp 12 maintains connection between the emergency power supply 11 and the external device 20.

According to one embodiment of the present invention, a predefined value, which is a predefined voltage value, can be set in the battery clamp 12 in advance. The battery clamp 12 compares whether the difference between voltages of any two of battery units exceeds the predefined voltage value: if the difference between voltages of any two of battery units exceeds the predefined voltage value, the battery clamp 12 switches off connection between the emergency power supply 11 and the external device 20, so as to stop power supply to the external device 20; if the difference between voltages of any two of battery units is below or equal to the predefined voltage value, the battery clamp 12 maintains connection between the emergency power supply 11 and the external device 20.

According to one embodiment of the present invention, the predefined temperature value is 55° C., and the predefined voltage value is 1V. If the temperature of a battery unit exceeds the predefined temperature value of 55° C., the battery clamp 12 stops power supply to the external device 20. If the difference between voltages of any two of battery units exceeds the predefined voltage value of 1V, the battery clamp 12 stops power supply to the external device 20, so as to protect the emergency power supply 11.

According to another embodiment of the present invention, the corresponding actions further comprise: selecting an operating mode which corresponds to the type of a battery module, such that the battery clamp 12 can match different types of batteries.

According to one embodiment of the present invention, the battery clamp 12 can set corresponding operating modes, such as operating voltage of a battery, low voltage alert threshold and/or protection threshold of starting electric current etc., based on the type of a battery module. For example, the battery clamp 12 can receive type of a battery module which is sent by the emergency power supply 11. If the type of a battery module is a 3C lithium cobalt oxide battery, as illustrated in Table 2, the battery clamp 12 will set the operating voltage of 8.1-12.6V, the protection threshold of starting electric current of 550 A, and low voltage alert threshold of 2.7V. When the voltage of a battery unit is below 2.7V, or the starting electric current exceeds 550 A, alert etc. will be triggered for warning users.

According to another embodiment of the present invention, the corresponding actions further comprise: setting protection threshold of starting electric current based on capacity of a battery module. Capacity of a battery module is amount of battery capacity. Maximum value of allowable starting electric current, i.e. protection threshold of starting electric current, can be set based on the capacity of a battery module, so as to prevent breakdown resulted from the oversized electric current. Accordingly, the emergency power supply 11, the battery clamp 12, and the external device 20 can be effectively protected.

Referring to FIG. 1, both the emergency power supply 11 and the battery clamp 12, which can be used to implement the method illustrated in FIG. 7, can comprise control chips. Control programs can be written into the control chips for performing corresponding logical operations.

In conclusion, after the battery clamp 12 has received parameters of the emergency power supply 11, it will perform corresponding actions based on the parameters. The actions include but are not limited to: switching into an operating mode which is matched with the emergency power supply 11, switching off an electric current output switch, sending an alert etc. For example, after obtaining parameters sent from emergency power supply 11, the battery clamp 12 will be switched into an operating mode, which matches the type of a battery module indicated in the parameters. Again, when the parameters indicate that the temperature of batteries is abnormal, or the batteries are under voltage, the battery clamp 12 will switch off electric current output.

The method in FIG. 7 can monitor status of the emergency power supply 11 in real time, thereby solving the problems, e.g. battery bulge resulted from large starting electric current, high temperature and over-charging or over-discharging, or even an explosion which will cause personal injury and property loss.

Figure 8:
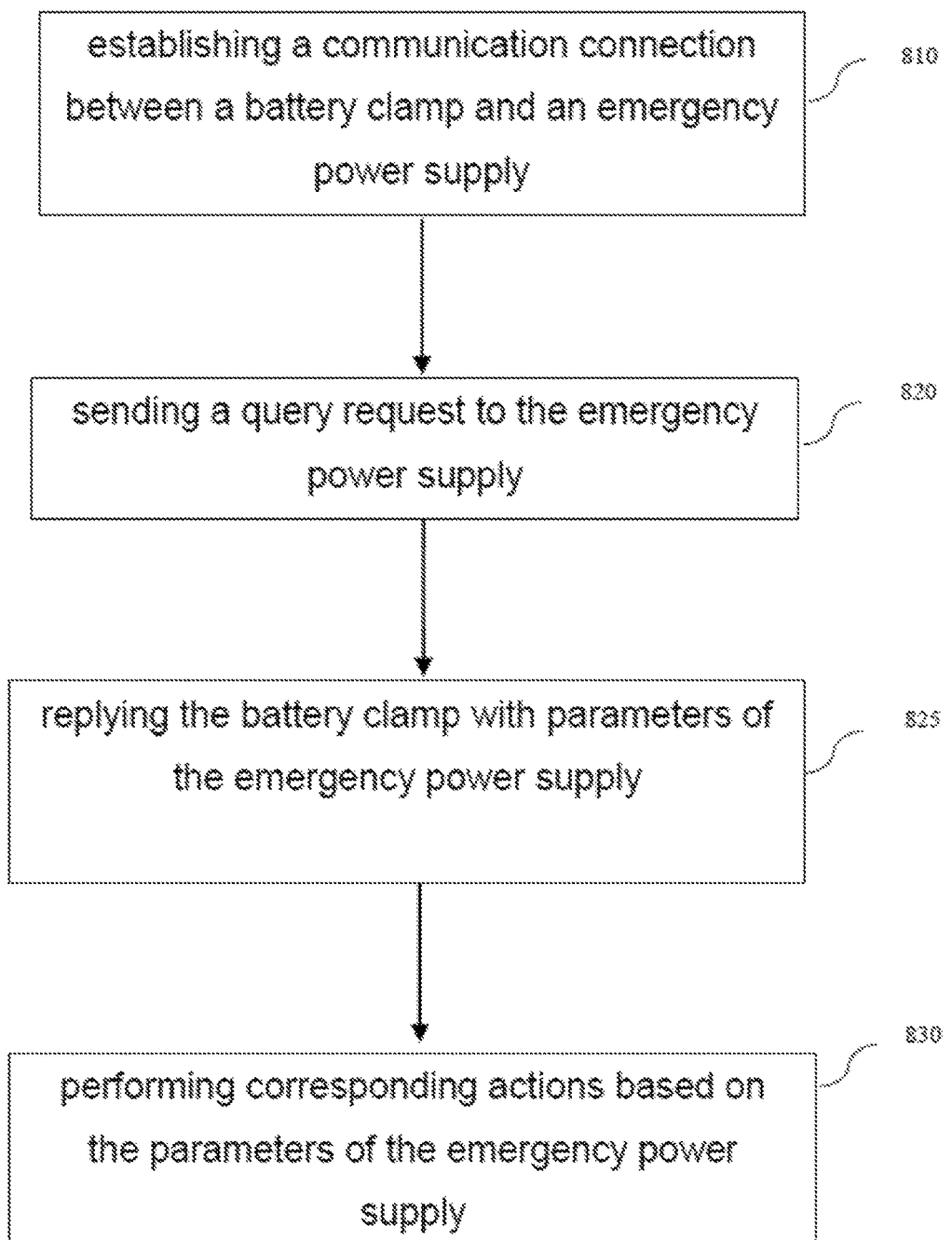
FIG. 8 is a flow diagram of a method for managing an emergency power supply according to another embodiment the present invention.

FIG. 8 is a flow diagram of a method for managing an emergency power supply system according to another embodiment of the present invention.

As illustrated in FIG. 8, the method comprises the following steps:

S810: establishing a communication connection between the battery clamp 12 and the emergency power supply 11.

S820: by the battery clamp 12, sending a query request to the emergency power supply 11.

S825: in response to the query request, by the emergency power supply 11, replying the battery clamp 12 with parameters of the emergency power supply 11.

S830: by the battery clamp 12, switching on or off connection between the emergency power supply 11 and the external device 20 based on the parameters of the emergency power supply 11.

Steps 810, 830 above are substantially identical to Steps 710, 730 in the aforesaid embodiment respectively, and no details regarding them will be discussed herein.

Compared with the aforesaid embodiment, the present embodiment additionally comprises: obtaining parameters of the emergency power supply by Steps 820, 825.

In Step 820, the battery clamp 12 can periodically send a query request to the emergency power supply 11 based on actual needs.

In Step 825, after the query request has been received, the emergency power supply 11 then sends parameters to the battery clamp 12

In this way, the emergency power supply 11 can feedback relevant information of a battery module based on the requirement of the battery clamp 12, thereby saving resources. After the battery clamp 12 has sent a query request to the emergency power supply 11, if the battery clamp 12 does not receive any parameters sent from the emergency power supply 11 within a predefined time, the communication connection is proved to be fail. Thus, the battery clamp 12 will sent an alert message to inform users about the failure of communication, which further improves the security.

The data packet of a query request in the embodiment of the present invention comprises: a second start bit, second data bits, and a second end bit. The second start bit is used for synchronizing, and the second end bit indicates termination of data transmission. Preferably, the second data bits are matched with the first data bits for representing the types to be inquired. For example, the battery clamp 12 wants to inquire type of a battery module, battery status, or both of the two. The match between the definition of the second data bits and the definition of the first data bits makes the communication protocol much easier.

TABLE 4

A data packet for a query request

| Second start bit | Second data bits | Second end bit |
|---|---|---|

Although the aforesaid embodiments are preferred in the present invention, none of them shall be regarded as a limitation. Any modifications, improvements, or equivalents within spirit or scope of the preset invention fall into the protection scope of the present invention.

What is claimed is:

1. An emergency power supply system for supplying power to an external device, comprising: an emergency power supply and a battery clamp unit connected to the emergency power supply,
the emergency power supply comprises:
a battery module, and
a first master-control unit connected to the battery module for monitoring the battery module;
the battery clamp unit comprises:
a battery clamp for connecting to the external device;
a second master-control unit communicatively connected to the first master-control unit for obtaining parameters of the emergency power supply, and
a switch controlled by the second master-control unit, and being connectable to the external device;
wherein the parameters of the emergency power supply comprise a type of electrode materials of the battery module, and the second master-control unit is further configured to, based on the type of electrode materials of the battery module, select an operating mode of the battery clamp unit by setting at least one reference operating condition;
when the operating mode is selected, the second master-control unit is configured to compare the parameters of the emergency power supply other than the type of electrode materials of the battery module with the at least one reference operating condition and control switching of the switch based on the comparison results.

2. The system of claim 1, wherein
the battery module comprises at least one battery pack, and
the at least one battery pack comprises at least one battery unit.

3. The system of claim 2, wherein the parameters of the emergency power supply further comprise at least one of the following: capacity of the battery module, temperature of the at least one battery unit or battery pack, voltage of the at least one battery unit.

4. The system of claim 3, wherein the second master-control unit is further configured to control the switching of the switch control unit based on the received parameters of the emergency power supply, thereby controlling power connection between the emergency power supply and the external device.

5. The system of claim 4, wherein the parameters of the emergency power supply comprise temperature of the at least one battery unit or battery pack and the second master-control unit is further configured to compare the temperature of the at least one battery unit or battery pack with a predefined temperature value, and control the switching of the switch based on the comparison result.

6. The system of claim 4, wherein the battery pack comprises two or more battery units and the parameters of the emergency power supply comprise voltages of the two or more battery unit and the second master-control unit is further configured to compare the difference between the voltages of any two of the battery units with a predefined voltage value, and control the switching of the switch based on the comparison result.

7. The system of claim 2, wherein the first master-control unit comprises a temperature detection circuit for detecting temperature parameters of the at least one battery unit or battery pack.

8. The system of claim 7, wherein the temperature detection circuit comprises one or more NTC thermistors for detecting the temperature parameters of the at least one battery unit or battery pack.

9. The system of claim 2, wherein the first master-control unit comprises a voltage sampling circuit connected to the at least one battery unit for detecting voltage parameters of the at least one battery unit.

10. The system of claim 1, wherein the at least one reference operating condition comprises at least one of the following: ranges of operating voltage, protection thresholds of starting electric current, or low voltage alert threshold for the emergency power supply.

11. A method for managing an emergency power supply system, wherein the system comprises a battery clamp unit and an emergency power supply connected to an external device via a battery clamp of the battery clamp unit, and the method comprises:
establishing a communication connection between a second master-control unit of the battery clamp unit and a first master-control unit of the emergency power supply;
obtaining, by the second master-control unit of the battery clamp unit, parameters of the emergency power supply via the communication connection;
wherein the parameters of the emergency power supply comprise a type of electrode materials of a battery module of the emergency power supply, and the method further comprises:
selecting, by the second master-control unit, based on the type of electrode materials of the battery module, an operating mode of the battery clamp unit by setting at least one reference operating condition;
when the operating mode is selected, the second master-control unit is configured to compare the parameters of the emergency power supply other than the type of electrode materials of the battery module with the at least one reference operating condition and control switching of a switch, which is controlled by the second master-control unit and being connectable to the external device, based on the comparison results.

12. The method of claim 11, wherein the battery module comprises at least one battery pack, and the at least one battery pack comprises at least one battery unit;
the parameters of the emergency power supply further comprise at least one of the following: capacity of the battery module, temperature of the at least one battery unit or battery pack, voltage of the at least one battery unit.

13. The method of claim 12, wherein the parameters of the emergency power supply comprise temperature of the at least one battery unit or battery pack and the second master-control unit is configured to:
determine whether the temperature of the at least one battery unit or battery pack is above a predefined temperature value,
if yes, control the switch to become an off state.

14. The method of claim 12, wherein the battery pack comprises two or more battery units and the parameters of the emergency power supply comprise voltages of the two or more battery unit and the second master-control unit is configured to:
determine whether the difference between voltages of any two of the battery units are above a predefined voltage value,
if yes, control the switch to become an off state.

15. The method of claim 11, wherein the at least one reference operating condition comprises at least one of the following: ranges of operating voltage, protection threshold of starting electric current, or low voltage alert threshold for the emergency power supply.

16. The method of claim 11, wherein the step of obtaining the parameters of the emergency power supply further comprises:
- sending, by the battery clamp unit, a query request to the emergency power supply;
- in response to the query request, replying, by the emergency power supply, to the battery clamp unit with parameters about the emergency power supply.

17. The method of claim 16, wherein the query request is represented by a data packet, which comprises at least: a second start bit, one or more second data bits, and a second end bit.

18. The method of claim 11, wherein the parameters of the emergency power supply is represented by a data packet, which comprises at least: a first start bit, one or more first data bits, and a first end bit.

\* \* \* \* \*